(12) United States Patent
Piotrowski et al.

(10) Patent No.: US 11,891,906 B2
(45) Date of Patent: Feb. 6, 2024

(54) BEARING HOUSING

(71) Applicant: PRATT & WHITNEY CANADA CORP., Longueuil (CA)

(72) Inventors: Maciej Piotrowski, Rzeszow (PL); Lukasz Pokrzywa, Trzebownisko (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 110 days.

(21) Appl. No.: 17/651,913

(22) Filed: Feb. 22, 2022

(65) Prior Publication Data
US 2023/0265768 A1 Aug. 24, 2023

(51) Int. Cl.
*F01D 25/18* (2006.01)
*F16C 33/66* (2006.01)
*F01D 25/16* (2006.01)
*F16F 15/023* (2006.01)

(52) U.S. Cl.
CPC ........... *F01D 25/18* (2013.01); *F01D 25/162* (2013.01); *F16C 33/6685* (2013.01); *F16F 15/0237* (2013.01); *F16C 2360/23* (2013.01)

(58) Field of Classification Search
CPC .............. F16C 33/6685; F16C 2360/23; F16C 35/042; F16C 35/067; F16C 35/077; F16F 15/0237; F01D 25/16–164; F01D 25/18
See application file for complete search history.

(56) References Cited

U.S. PATENT DOCUMENTS 9,890,810 B2  2/2018 Kawashita et al.
10,662,998 B2  5/2020 Zhong
2015/0078694 A1* 3/2015 Mola .................. F16C 33/726
                                                        384/476
2017/0114831 A1* 4/2017 Snow .................. F16C 27/045
2017/0314417 A1* 11/2017 Van Den Berg ........ F01D 25/20
2019/0257214 A1* 8/2019 Pankratov ............. F16C 33/768
2019/0360524 A1* 11/2019 Ellwood, III ......... F01D 25/164

FOREIGN PATENT DOCUMENTS

EP    0 042 320 A1   12/1981
EP    3 527 838 A1    8/2019

OTHER PUBLICATIONS

European Search Report issued in counterpart application 23158074.7 dated Jun. 14, 2023.

* cited by examiner

*Primary Examiner* — Alan B Waits
(74) *Attorney, Agent, or Firm* — NORTON ROSE FULBRIGHT CANADA LLP.

(57) ABSTRACT

A bearing housing for a bearing having an outer race, the bearing housing comprising: an annular wall extending about an axis and axially between a first end and a second end, the annular wall including: a plurality of holes spaced circumferentially from one another and spaced axially from the first end, the plurality of holes extending through the annular wall toward the axis; and an interior housing surface extending about the axis and defining interior openings of the plurality of holes, the interior housing surface having a cylindrical portion defining a seat for radial engagement with the outer race, the cylindrical portion extending axially from a first location proximate to the first end to at least a second location between the first location and the interior openings.

18 Claims, 6 Drawing Sheets

FIG_3

BEARING HOUSING

TECHNICAL FIELD

The application relates generally to bearings and, more particularly, to bearing housings.

BACKGROUND OF THE ART

Bearings are widely used in machinery to support rotatable components about corresponding rotation axes, for example in powerplants to support a shaft thereof. The performance and durability of a bearing is largely driven by its structural and dimensional characteristics, but also by the loading conditions in play, whether they pertain to components supporting the bearing or to components supported by the bearing. Whereas some deformation of the bearing and of its adjoining components may be expected under typical loading conditions, controlling such deformation may be beneficial to bearing durability.

SUMMARY

In accordance with an aspect of the present technology, there is provided a bearing housing for a bearing having an outer race, the bearing housing comprising: an annular wall extending about an axis and axially between a first end and a second end, the annular wall including: a plurality of holes spaced circumferentially from one another and spaced axially from the first end, the plurality of holes extending through the annular wall toward the axis; and an interior housing surface extending about the axis and defining interior openings of the plurality of holes, the interior housing surface having a cylindrical portion defining a seat for radial engagement with the outer race, the cylindrical portion extending axially from a first location proximate to the first end to at least a second location between the first location and the interior openings.

In accordance with another aspect of the present technology, there is provided a bearing assembly comprising: a housing including an annular wall extending about an axis and axially between a first housing end and a second housing end, the annular wall including: a plurality of holes spaced circumferentially from one another and spaced axially from the first housing end, the plurality of holes extending through the annular wall toward the axis; and an interior housing surface extending about the axis and defining interior openings of the plurality of holes, the interior housing surface having a cylindrical portion circumscribing a bearing cavity, the cylindrical portion extending axially from a first location proximate to the first housing end to at least a second location between the first location and the interior openings; a bearing including an outer race extending about the axis and axially between a first outer-race end and a second outer-race end, the outer race received by the housing inside the bearing cavity such that the first outer-race end is proximate to the first housing end and the second outer-race end is proximate to the interior openings.

In accordance with another aspect of the present technology, there is provided a turbine engine comprising: a casting defining a wet cavity; a housing including an annular wall extending about an axis and axially between a first housing end away from the casting and a second housing end proximate to the casting, the annular wall including: a plurality of holes spaced circumferentially from one another and spaced axially from the first housing end, the plurality of holes extending through the annular wall toward the axis; and an interior housing surface extending about the axis and defining interior openings of the plurality of holes, the interior housing surface having a cylindrical portion circumscribing a bearing cavity in fluid communication with the wet cavity, the cylindrical portion extending axially from a first location proximate to the first housing end to at least a second location between the first location and the interior openings, the plurality of holes in fluid communication with the wet cavity via the bearing cavity; a bearing including an outer race extending about the axis and axially between a first outer-race end and a second outer-race end, the outer race received by the housing inside the bearing cavity such that the first outer-race end is located proximate to the first housing end and the second outer-race end is located proximate to the interior openings.

DESCRIPTION OF THE DRAWINGS

Reference is now made to the accompanying figures in which.

DETAILED DESCRIPTION

Figure 1:
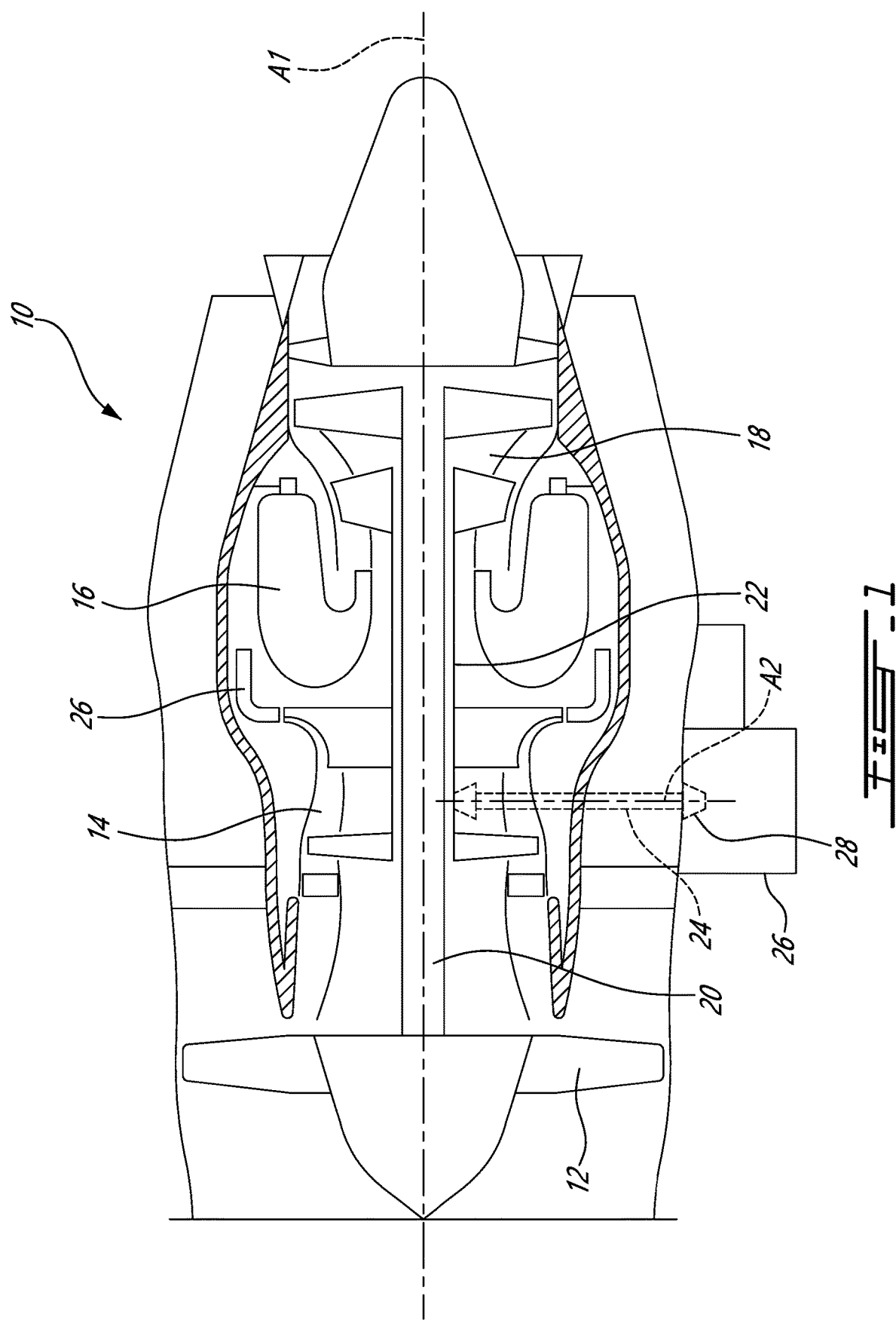
FIG. 1 is a schematic cross-sectional view of an engine.

FIG. 1 illustrates a gas turbine engine 10 of a type preferably provided for use in subsonic flight, generally comprising in serial flow communication a fan 12 through which ambient air is propelled, a centrifugal compressor 14 for pressurizing the air, a combustor 16 in which the compressed air is mixed with fuel and ignited for generating an annular stream of hot combustion gases, and turbines 18 for extracting energy from the combustion gases. A low-pressure turbine shaft 20 along a longitudinal axis A1 interconnects a low pressure turbine of the turbines 18 and the fan 12, whereas a high-pressure turbine shaft 22 also along the longitudinal axis A1 interconnects a high pressure turbine of the turbines 18 and the compressor 14. A tower shaft 24 along a radial axis A2 interconnects the high-pressure turbine shaft 22 and an accessory gearbox 26 of the engine 10. In use, pressurized air provided by the compressor 14 through a diffuser 26 enters the combustor 16 for combustion so as to drive the shafts 20, 22, 24 via the turbines 18. The shafts 20, 22, 24 are supported about their respective axes A1, A2 via bearings. While the Figures and this description discuss the gas turbine engine 10 and more particularly a turbofan gas turbine engine, it shall be understood that the present disclosure is applicable to other types of machinery comprising bearing-supported rotatable components.

Figure 2:
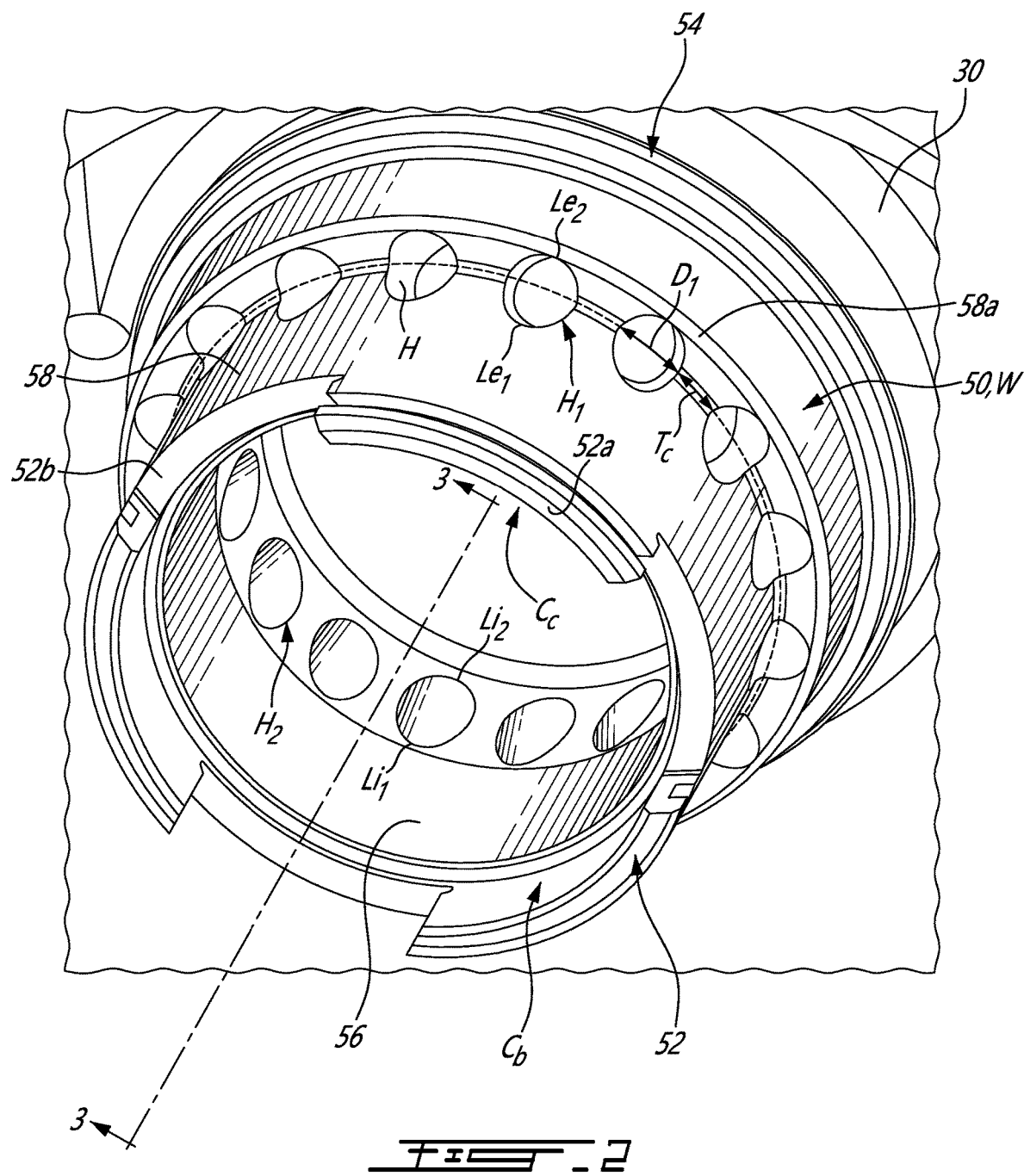
FIG. 2 is a perspective view of a casting and a housing of the engine of FIG. 1 in accordance with an embodiment.
Figure 3:
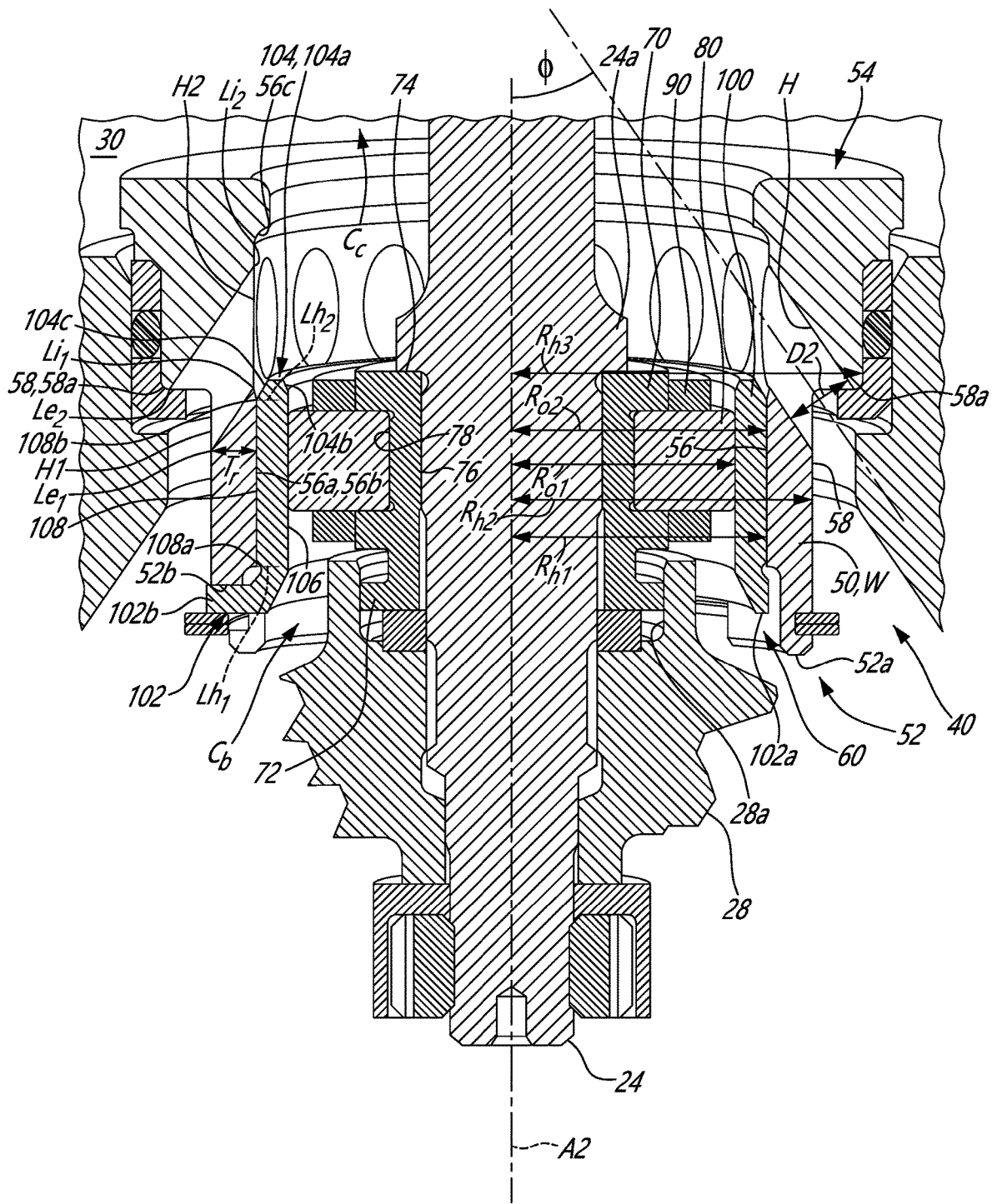
FIG. 3 is a cross-sectional view of a bearing assembly including the housing of FIG. 2 and taken along the line 3-3 of FIG. 2.

Referring to FIGS. 2 and 3, there is shown a casting 30 of the engine 10 with a bearing assembly 40 (FIG. 3) fitted thereto. The casting 30 defines a casting cavity $C_c$ that may be described as a wet cavity as it is exposed to oil provided from an oil system of the engine 10. The bearing assembly 40 generally includes a housing 50 defining a bearing cavity $C_b$ and a bearing 60 fitted to the housing 50 inside the bearing cavity $C_b$. The bearing cavity $C_b$ is in fluid communication with the casting cavity $C_c$, such that the bearing 60 is exposed to oil having flowed from the casting cavity $C_c$ and into the bearing cavity $C_b$. In FIG. 2, only the housing 50 is shown, the shaft 24, the gear 28 and the bearing 60 having been removed in order to show the bearing cavity $C_b$ in detail.

The housing 50 will now be generally described with reference to FIG. 2. The housing 50 generally comprises an annular wall W extending circumferentially about the axis A2 and axially between opposite first and second housing ends 52, 54. The annular wall W surrounds the bearing cavity $C_b$. The first housing end 52 is spaced from the casting 30, and defines an open side of the bearing cavity $C_b$ via which the bearing 60 is received into the bearing cavity $C_b$. In this case, the first housing end 52 is free of any contact except with the bearing 60. The second housing end 54 is fitted to a complementary portion of the casting 30 so as to be constrained thereby. Thus, the housing 50 is held by the casting 30 at the second housing end 54. Stated otherwise, the housing 50 and the casting 30 are arranged relative to one another such that the casting 30 opposes axial and radial displacements of the second housing end 54 which may otherwise occur under certain loading conditions of the housing 50, for example loads exerted onto the housing 50 via the bearing 60. The second housing end 54 is affixed to the casting 30 via welding, friction or other suitable means, whether directly or indirectly by way of an intermediate structure. In other embodiments, the housing 50 and the casting 30 form an integral piece, such that the annular wall W may be described as a projection of the casting 30. The housing 50 also has an interior housing surface 56 extending circumferentially about the axis A2 and axially between the first and second housing ends 52, 54. Proximate to the first housing end 52, the interior housing surface 56 has a cylindrical portion 56a that defines a seat 56b. The seat 56b defines a first housing radius $R_{h1}$ of the housing 50 and circumscribes the bearing cavity $C_b$. The seat 56b is configured to radially engage the bearing 60, as will be described in greater detail below. The cylindrical portion 56a of the interior housing surface 56 extends axially from a first housing location $L_{h1}$ proximate to the first housing end 52 to at least a second housing location $L_{h2}$. Depending on the embodiment, first housing location $L_{h1}$ and the second housing location $L_{h2}$ may be said to axially delimit the seat 56b. Proximate to the second housing end 54, the interior housing surface 56 defines a housing cavity in fluid communication between a casting cavity $C_c$ of the casting 30 and the bearing cavity $C_b$. The bearing cavity $C_b$ may be said to be a portion of the housing cavity sized for receiving the bearing 60. The housing 50 also has an exterior housing surface 58 extending circumferentially about the axis A2 and axially between the first and second housing ends 52, 54. Proximate to the first housing end 52, the exterior housing surface 58 is cylindrical in shape, defines a second housing radius $R_{h2}$ of the housing 50, and is disposed radially outward of the interior housing surface 56. Hence, the second housing radius $R_{h2}$ is greater than the first housing radius $R_{h1}$. A difference between the second and first housing radii $R_{h2}$, $R_{h1}$ corresponds to a radial thickness $T_r$ of the housing 50. Proximate to the first housing end 52, the annular wall W may thus be said to be cylindrical in shape and to have the radial thickness $T_r$.

Proximate to the second housing end 54, the exterior housing surface 58 is also cylindrical in shape, and yet defines a third housing radius $R_{h3}$ of the housing 50 that is greater than the second housing radius $R_{h2}$. Indeed, as the exterior housing surface 58 extends away from the first housing end 52 and toward the second housing end 54, the exterior housing surface 58 transitions from the second housing radius $R_{h2}$ to the third housing radius $R_{h3}$ by way of a shoulder 58a. It is contemplated that in other embodiments, a shape of the housing 50 may be different. For example, the exterior housing surface 58 could transition from the second housing radius $R_{h2}$ to the third housing radius $R_{h3}$ by way of a conical shape. In other embodiments, the annular wall W could be cylindrical in shape from the first housing end 52 to the second housing end 54.

In other embodiments, the housing 50 can include additional structures located adjacent to the annular wall W at either one or both of the first housing end 52 and the second housing end 54. For instance, the housing 50 may extend away from the casting 30 to a location past the first housing end 52. In this embodiment, at the first housing end 52, the housing 50 has a first housing axial surface 52a extending circumferentially about the axis A2. A plurality of keyways 52b are defined in the first housing axial surface 52a. The keyways 52b are circumferentially spaced from one another and extend radially through the housing 50 from the exterior housing surface 58 to the interior housing surface 56. The first housing axial surface 52a may thus be said to be formed of sectors that are circumferentially spaced from one another by one of the keyways 52b.

The annular wall W of the housing 50 also defines a plurality of holes H that are spaced circumferentially from one another relative to the axis A2 and that extend through the annular wall W toward the axis A2, from the exterior housing surface 58 to the interior housing surface 56. The holes H are thus in fluid communication with inside the bearing cavity $C_b$, and with inside the casting cavity $C_c$ via the bearing cavity $C_b$. The holes H are spaced axially relative to the first housing end 52 so as to be proximate to a side of the bearing 60 that faces toward the second housing end 54 upon the bearing 60 being received by the bearing cavity $C_b$. In some embodiments, the holes H serve as drain ports, as they allow drainage of oil which would otherwise accumulate onto the bearing 60. The holes H are structured and arranged relative to the seat 56b so as to relieve stress exerted by the housing 50 onto the bearing 60. Further characteristics of the holes H and their relationship with the bearing 60 will be discussed hereinbelow.

The bearing 60 will now be generally described with reference to FIG. 3. The bearing 60 generally includes an inner race 70 extending circumferentially about the axis A2 and mounted to the shaft 24, a series of rolling elements 80 disposed circumferentially about the axis A2 and around the inner race 70, an annular cage 90 shaped for maintaining each rolling element of the series of rolling elements 80 in a suitable spatial relationship relative to one another, and an outer race 100 extending circumferentially about the axis A2 and around the series of rolling elements 80.

The inner race 70 includes a first inner-race end 72 and a second inner-race end 74 axially opposite to the first inner-race end 72. In this case, the first inner-race end 72 faces toward a recess 28a of a gear 28 mounted to the shaft 24, and the second inner-race end faces toward a shoulder 24a of the shaft 24. The inner race 70 also includes an interior inner-race surface 76 extending circumferentially about the axis A2 and axially between the first and second inner-race ends 72, 74. The inner race 70 is mounted to the shaft 24 via the interior inner-race surface 76. The inner race 70 also includes an exterior inner-race surface 78 shaped for interfacing with the series of rolling elements 80. In this embodiment, the exterior inner-race surface 78 defines a recess sized for receiving the series of rolling elements 80.

The outer race 100 includes a first outer-race end 102 and a second outer-race end 104 opposite the first outer-race end 102. In this case, the first outer-race end 102 faces toward the gear 28, and the second outer-race end 104 faces toward the casting 30. The outer race 100 also includes an interior outer-race surface 106 that extends circumferentially about the axis A2 and axially between the first and second outer-race ends 102, 104. The interior outer-race surface 106 defines a first outer-race radius $R_{o1}$ of the outer race 100 that is suitable for interfacing with the series of rolling elements 80. The outer race 100 also includes an exterior outer-race surface 108 that extends circumferentially about the axis A2 and axially between the first and second outer-race ends 102, 104. The exterior outer-race surface 108 extends axially from a first edge 108a to a second edge 108b. The exterior outer-race surface 108 defines a second outer-race radius $R_{o2}$ of the outer race 100 that is greater than the first outer-race radius $R_{o1}$, and is suitable for interfacing with the housing 50. Indeed, the exterior outer-race surface 108 radially engages the seat 56b of the interior housing surface 56.

In this embodiment, the first outer-race end 102 is structured and arranged so as to engage the first housing end 52 upon the outer race 100 being mounted to the housing 50 inside the bearing cavity $C_b$. At the first outer-race end 102, the outer race 100 includes a first outer-race axial surface 102a defining a flange 102b that extends radially to outward of the exterior outer-race surface 108. In this case, the flange 102b is circumferentially sectored, i.e., is formed of a plurality of radial projections, or keys, that are spaced circumferentially from one another. Each one of the keys is sized and arranged to be received by a corresponding one of the keyways 52b. In other embodiments, the keyways 52b are omitted, and the flange 102b engages the first housing axial surface 52a. In other embodiments, the flange 102b is omitted, and the first outer-race end 102 does not engage the first housing end 52.

In this embodiment, the second outer-race end 104 defines a second outer-race axial surface 104a. The second outer-race end 104 transitions from the second outer-race axial surface 104a to the interior outer-race surface 106 and to the exterior outer-race surface 108 by way of an inner transition surface 104b and an outer transition surface 104c respectively. In this embodiment, both transition surfaces 104b, 104c are tapering, or beveled, surfaces, although other shapes are contemplated. Depending on the embodiment, either one or both of the transition surfaces 104b, 104c may be omitted.

Figure 4:
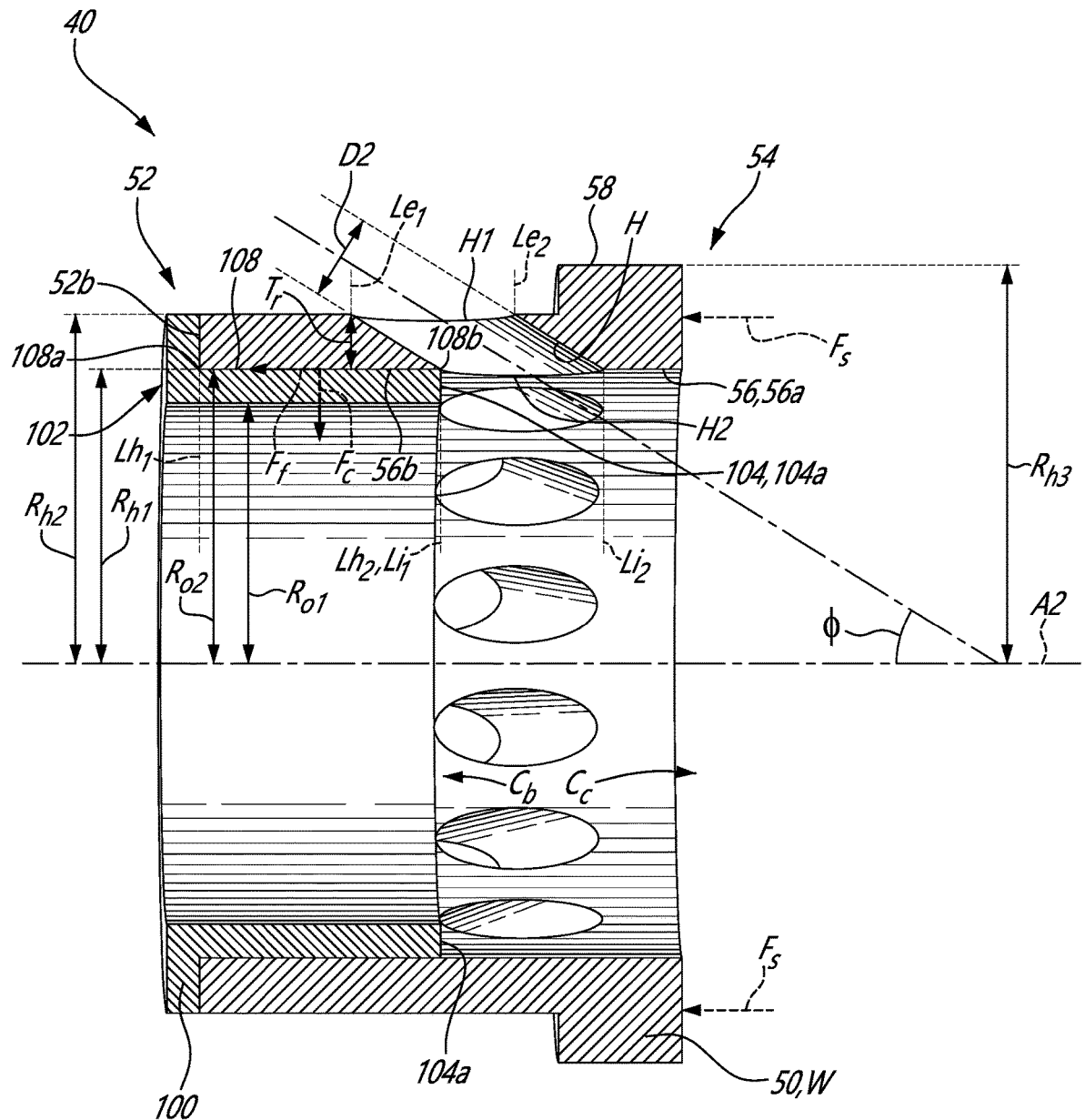
FIG. 4 is a cross-sectional view of a housing and of a bearing outer race in accordance with another embodiment.

With reference to FIGS. 3 and 4, loading characteristics of the bearing assembly 40 will now be described. The outer race 100 is mounted to the housing 50 via the exterior outer-race surface 108, namely by a radial engagement between the exterior outer-race surface 108 and the seat 56b of the interior housing surface 56. The second outer-race radius $R_{o2}$ is greater than the first housing radius $R_{h1}$, such that the second outer-race radius $R_{o2}$ and the first housing radius $R_{h1}$ may be said to define an interference fit. Upon the outer race 100 being mounted to the housing 50, the exterior outer-race surface 108 overlaps the seat 56b of the interior housing surface 56 as it extends away from the first housing end 52 toward the second housing end 54. In order to mount the outer race 100 to the housing 50, the outer race 100 must be axially forced into the bearing cavity $C_b$, in this case via the first housing end 52. The outer transition surface 104c may act as a wedge that assists in radially-inwardly compressing the outer race 100 as it is axially forced in the bearing cavity $C_b$. As the housing 50 receives the outer race 100, the housing 50 exerts loads onto the outer race 100 via the interior housing surface 56, namely radially-inward compression (schematically shown at $F_c$) as well as axially-outward friction (schematically shown at $F_f$), i.e., friction that is directed opposite a direction of insertion of the outer race 100. Also, external support of the bearing assembly 40 is provided axisymmetrically and unilaterally (schematically shown at $F_s$) via the engagement of the second housing end 54 with the casting 30. In use, the above-mentioned loading conditions, coupled to loads exerted onto the bearing 60 via the inner race 70, lead to radial deformation of the outer race 100. Such deformation may be described as "coning", as the portion of the outer race 100 loaded by the housing 50 collapses radially inwardly, and increasingly so as it extends into the housing 50 toward the second housing end 54. Such deformation may be of a magnitude that is greater near the second outer-race end 104 for example at the second edge 108b of the exterior outer-race surface 108, than near the first outer-race end 102, for example at the first edge 108a. The housing 50 is provided with features, such as the plurality of holes H, that are sized and arranged for attenuating such deformation. The plurality of holes H locally reduce a stiffness of the housing 50 at an axial location of the housing 50 that is proximate to the second outer-race end 104 upon the outer race 100 being mounted to the housing 50 so as to mitigate coning, i.e., to render the magnitude of any radial deformation of the outer race 100 similar from the first end 102 to the second end 104.

A first cross-sectional dimension D1 (FIG. 2) of the holes H is defined circumferentially with respect to the axis A2, whereas a second cross-sectional dimension D2 (FIG. 3) of the holes H is defined perpendicularly to the first cross-sectional dimension D1. In this embodiment, the holes H are cylindrical, such that the first and second cross-sectional dimensions D1, D2 correspond to diameters of the hole H having a same length. The holes H extend toward the axis A2 at a skew angle $\Phi$ relative to the axis A2. Depending on the embodiment, the skew angle may be between 20 and 90 degrees. In some such embodiments, the skew angle $\Phi$ is between 25 and 70 degrees. In some such embodiments, the skew angle $\Phi$ is between 30 and 40 degrees. In this embodiment, the skew angle $\Phi$ is of about 35 degrees, and is acute toward the first housing end 52 such that the holes H extend axially away from the first housing end 52 as they extend radially toward the axis A2. The exterior housing surface 58 and the interior housing surface 56 respectively define exterior openings H1 and interior openings H2 of the holes H. In embodiments in which the skew angle $\Phi$ is acute toward the first housing end 52, each one of the holes H may be said to extend axially away from the second housing end 54 as it extends from their corresponding one of the interior openings H2 to their corresponding one of the exterior openings H1. This arrangement of the holes H may assist drainage of oil from the bearing cavity $C_b$ via the holes H, and in some cases deflect oil and possible contaminants away from the bearing 60. The exterior openings H1 extend axially away from the first housing end 52 from a first exterior axial location $L_{e1}$ to a second exterior axial location $L_{e2}$. The interior openings H2 extend axially from a first interior axial location $L_{i1}$ to a second interior axial location $L_{i2}$. The second housing location $L_{h2}$ is located between the first housing location $L_{h1}$ and the interior openings H2. Depending on the embodiment, the second housing location $L_{h2}$ can be axially spaced from the first interior location $L_{i1}$ (FIG. 3), and hence the seat 56b of the interior housing surface 56 may stop short of the interior openings H2. In this embodiment, the interior openings H2 are defined in a groove 56c of the housing 50 located axially between the cylindrical portion 56a and the second housing end 54. The second housing location $L_{h2}$ can otherwise correspond to the first interior location $L_{i1}$ (FIGS. 4, 5), in which case the cylindrical portion 56a may be said to define at least a portion of the interior openings H2. In this embodiment, due to the acute aspect of the skew angle Φ, the first exterior axial location $L_{e1}$ is closer to the first housing end 52 than the first interior axial location $L_{i1}$. It should also be noted that the first exterior axial location $L_{e1}$ is located axially between the first and the second edges 108a, 108b of the exterior outer-race surface 108. By this arrangement, the exterior openings H1 of the holes H overhang a portion of the seat 56b, and thus a portion of the exterior outer-race surface 108 via which the seat 56b of the housing 50 radially engages the outer race 100, thereby locally reducing the ability of the housing 50 to deform the underlying portion of the outer race 100. In this embodiment, the interior housing surface 56 defines a radius that is greater than the first housing radius $R_{h1}$ at both the first and the second interior axial locations $L_{i1}$, $L_{i2}$. In this embodiment, the exterior openings H1 overlap the shoulder 58a, such that the exterior housing surface 58 defines the second housing radius $R_{h2}$ at the first exterior axial location $L_{e1}$, and defines a radius that is greater than the second housing radius $R_{h2}$ at the second exterior axial location $L_{e2}$. It should also be noted that at the first exterior location $L_{e1}$, the interior housing surface 56 defines the first housing radius $R_{h1}$, such that the housing 50 has the radial thickness $T_r$ at the first exterior location $L_{e1}$.

Figure 5:
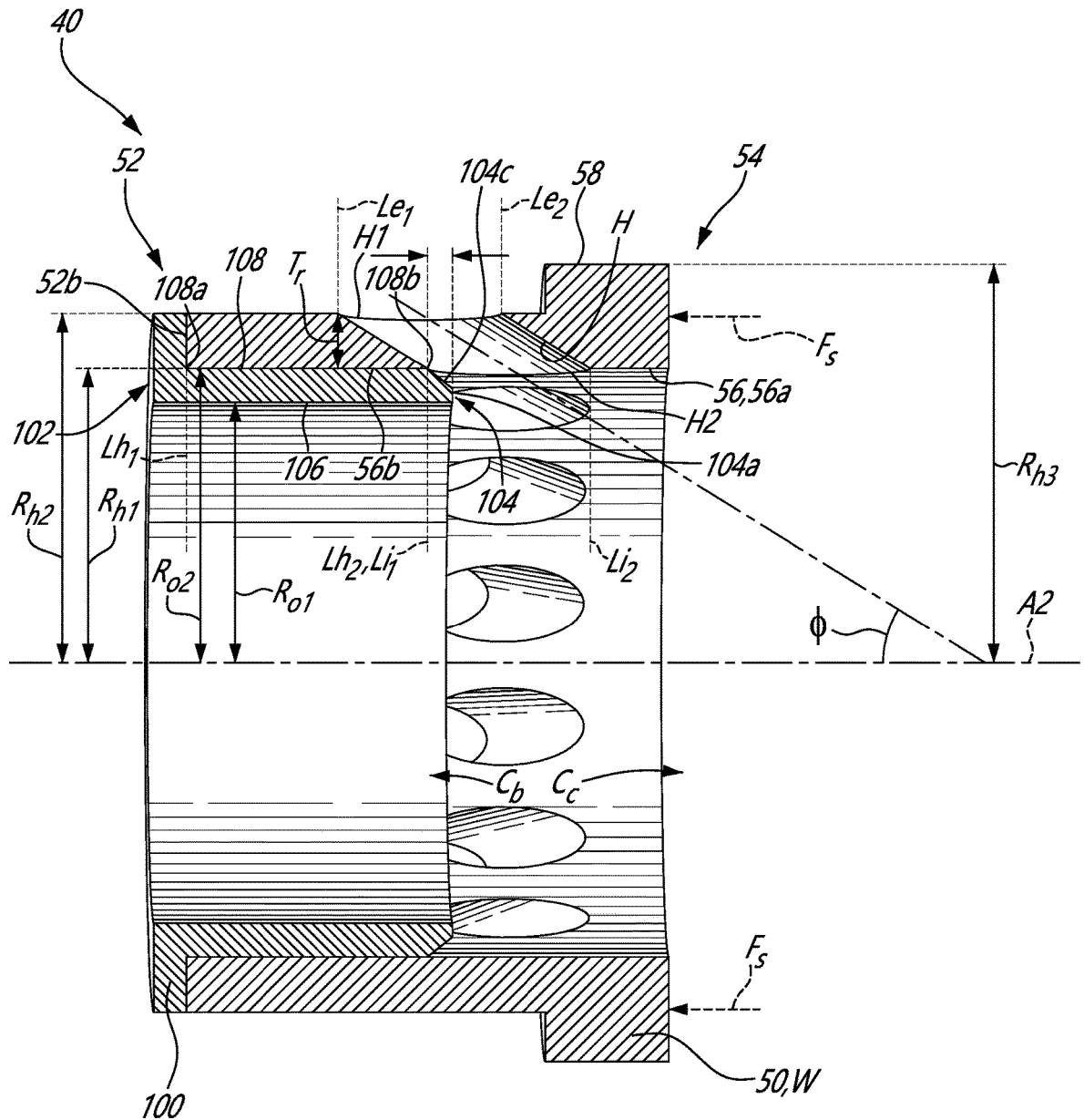
FIG. 5 is a cross-sectional view of a housing and of a bearing outer race in accordance with another embodiment.
Figure 6:
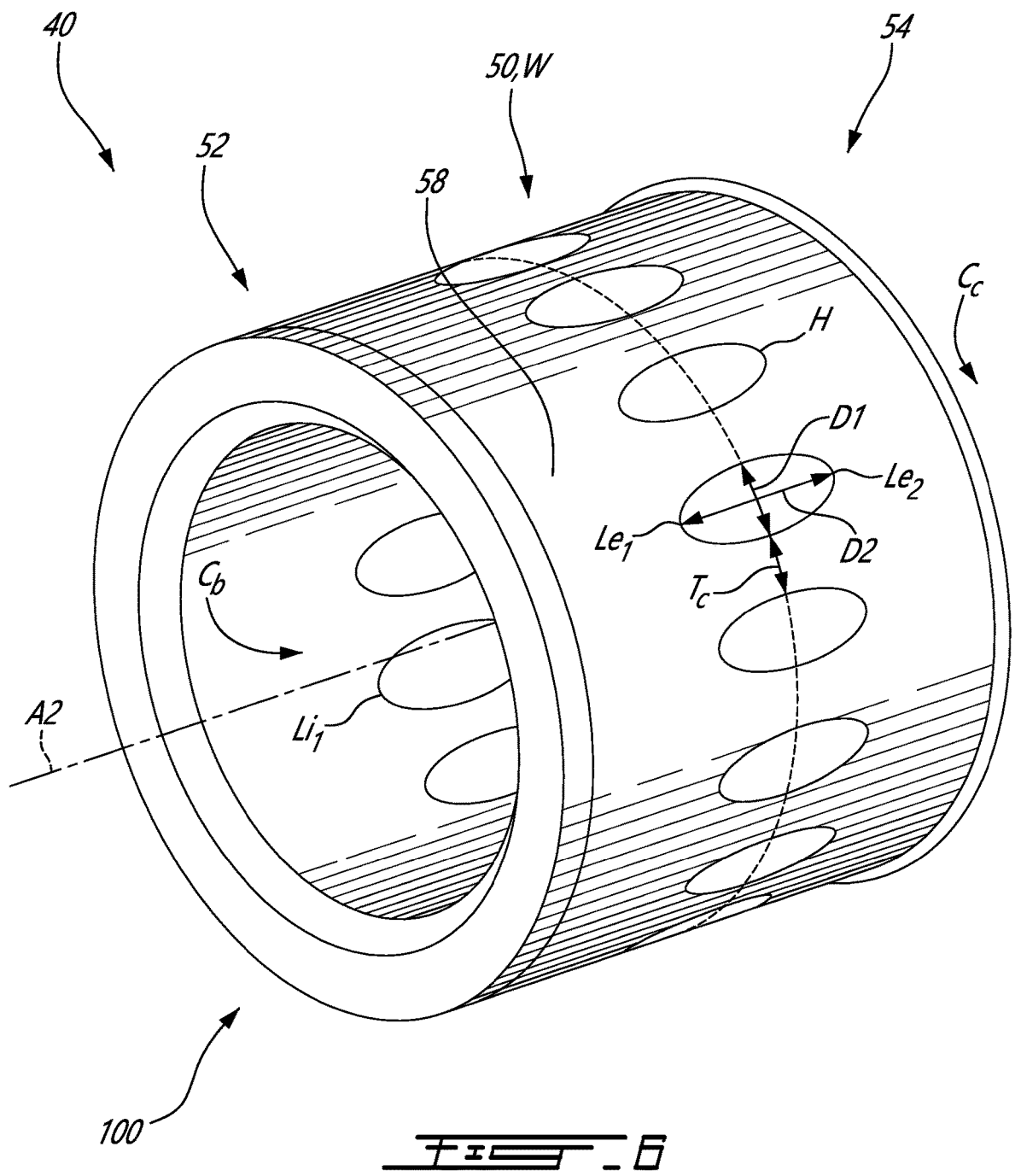
FIG. 6 is a perspective view of a housing and of a bearing outer race in accordance with another embodiment.

In the embodiments of FIGS. 2 and 3, of FIG. 4, of FIG. 5 and of FIG. 6, the housing 50 and the outer race 100 are arranged relative to one another such that the interior openings H2 of the holes H do not overlap the exterior outer-race surface 108. By this arrangement, the second edge 108b of the exterior outer-race surface 108 is fully circumscribed by the seat 56b of the interior housing surface 56. This allows to minimize circumferential variation in the radial deformation of the outer race 100 proximate to the second outer race end 104. In the embodiment of FIGS. 2 and 3, the first interior axial location $L_{i1}$ is spaced axially away from the first housing end 52 such that the second edge 108b of the exterior outer-race surface 108 is located axially between the first edge 108a and the first interior axial location $L_{i1}$. Stated otherwise, the exterior outer-race surface 108 extends axially toward the plurality of holes H from the first edge 108a located proximate to the first housing end 52 to the second edge 108b located proximate to the first interior axial location $L_{i1}$. The exterior outer-race surface 108 also stops short of the interior openings H2, i.e., the second edge 108b of the exterior outer-race surface 108 is spaced axially from the first interior axial location $L_{i1}$. The interior openings H2 of the holes H overlap a portion of the second outer-race end 104. Indeed, the outer transition surface 104c extends across the first interior axial location $L_{i1}$ as it extends from the second edge 108b to the second outer-race axial surface 104a. It should be noted however that the portion of the second outer-race end 104 overlapped by the interior openings H2 is spaced radially inwardly from the interior housing surface 56 and thus from the interior openings H2.

FIG. 4 shows another embodiment of the bearing assembly 40. In this embodiment, the cylindrical portion 56a of the interior housing surface 56 extends axially from the first housing location $L_{h1}$ to across the interior openings H2 toward the second housing end 54, and thus defines the interior openings H2. The seat 56b is adjacent to the interior openings H2 of the holes H at the first interior axial location $L_{i1}$. The skew angle Φ of the holes H is acute toward the first housing end 52. The exterior housing surface 58 defines the second housing radius $R_{h2}$ at the first exterior axial location $L_{e1}$ and at the second exterior axial location $L_{e2}$. The interior housing surface 56 defines the first housing radius $R_{h1}$ at the first interior axial location $L_{i1}$ and at the second interior axial location $L_{i2}$. The interior openings H2 of the holes H do not overlap the exterior outer-race surface 108 nor any other portion of the outer race 100. For instance, the second edge 108b of the exterior outer-race surface 108 and the second outer-race end 104 (in this case consisting of the second outer-race axial surface 104a) are at the first interior axial location $L_{i1}$.

FIG. 5 shows another embodiment of the bearing assembly 40. In this embodiment, the cylindrical portion 56a of the interior housing surface 56 extends axially from the first housing location $L_{h1}$ to across the interior openings H2 toward the second housing end 54, and thus defines the interior openings H2. The seat 56b is adjacent to the interior openings H2 of the holes H at the first interior axial location $L_{i1}$. The skew angle Φ of the holes H is acute toward the first housing end 52. The exterior housing surface 58 defines the second housing radius $R_{h2}$ at the first exterior axial location $L_{e1}$ and at the second exterior axial location $L_{e2}$. The interior housing surface 56 defines the first housing radius $R_{h1}$ at the first interior axial location $L_{i1}$ and at the second interior axial location $L_{i2}$. The interior openings H2 of the holes H do not overlap the exterior outer-race surface 108. For instance, the second edge 108b of the exterior outer-race surface 108 is at the first interior axial location $L_{i1}$. However, the interior openings H2 of the holes H do overlap the second outer-race end 104, as the outer transition surface 104c extends past the first interior axial location $L_{i1}$ toward the second interior axial location $L_{i2}$ as it extends from the second edge 108b to the second axial outer-race surface 104a. Also, the outer transition surface 104c tapers as it extends from the second edge 108b, such that it remains spaced radially inwardly from the interior housing surface 56 and thus of the interior openings H2.

FIG. 6 shows yet another embodiment of the bearing assembly 40. In this embodiment, the holes H extend radially relative to the axis A2, i.e., the skew angle Φ is a right angle. The holes H in this case have an elliptical cross-section, wherein the first cross-sectional dimension D1 is a length of a short axis thereof and the second cross-sectional dimension D2 is a length of a long axis thereof.

In embodiments such as those described hereinabove, the holes H are sized as a function of one or more dimensions of the housing 50 proximate to the second outer-race end 104 so as to achieve adequate radial deformation of the outer race 100. For example, the first cross-sectional dimension D1 (FIGS. 2, 6) may be sized as a function of the radial thickness $T_r$ of the housing 50 at a rated axial location of the housing 50. The rated axial location may be contiguous to the holes H on a side thereof that is proximate to the first housing end 52 and thus, in the depicted embodiments, corresponds to the first exterior location $L_{e1}$. The rated location may be between the first housing location $L_{h1}$ and the first exterior location $L_{e1}$. In embodiments, the first-cross-sectional dimension D1 is greater than the radial thickness $T_r$. In some such embodiments, the first cross-sectional dimension D1 is greater than 1.25 times the radial thickness $T_r$. In some such embodiments, the first cross-sectional dimension D1 is less than 1.75 times the radial thickness $T_r$. In some such embodiments, the first cross-sectional dimension D1 is between 1.35 and 1.55 times the radial thickness $T_r$. Moreover, the first cross-sectional dimension D1 may be sized as a function of a circumferential thickness $T_c$ (FIGS. 2 and 6) of the housing 50 defined between the holes H at the exterior housing surface 58, i.e., a minimum distance between two consecutive exterior openings H1. In embodiments, the first-cross-sectional dimension D1 is greater than the circumferential thickness $T_c$. In some such embodiments, the first cross-sectional dimension D1 is greater than 1.20 times the circumferential thickness $T_c$. In some such embodiments, the first cross-sectional dimension D1 is less than 1.60 times the circumferential thickness $T_c$. In some such embodiments, the first cross-sectional dimension D1 is between 1.30 and 1.50 times the circumferential thickness $T_c$. Hence, depending on the embodiment, the first cross-sectional dimension D1 may be at least equal to at least one of the radial thickness $T_r$ of the annular wall W and the minimum distance between exterior openings H1 of consecutive holes of the plurality of holes H.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A bearing housing for a bearing having an outer race, the bearing housing comprising:
   an annular wall extending about an axis and axially between a first end and a second end, the annular wall including:
     a plurality of holes spaced circumferentially from one another and spaced axially from the first end, the plurality of holes extending through the annular wall toward the axis; and
     an interior housing surface extending about the axis and defining interior openings of the plurality of holes, the interior housing surface having a cylindrical portion defining a seat for radial engagement with the outer race, the cylindrical portion extending axially from a first location proximate to the first end to at least a second location between the first location and the interior openings;
     wherein each hole of the plurality of holes has a cross-sectional dimension being at least equal to at least one of a radial thickness of the annular wall and a minimum distance between exterior openings of consecutive holes of the plurality of holes.

2. The bearing housing of claim 1, wherein the cylindrical portion defines at least a portion of the interior openings.

3. The bearing housing of claim 2, wherein the cylindrical portion defines the interior openings, the cylindrical portion extending axially from the first location to across the interior openings toward the second end.

4. The bearing housing of claim 1, wherein each hole of the plurality of holes extends toward the axis at a skew angle relative to the axis, the skew angle being acute toward the first end.

5. The bearing housing of claim 4, wherein the skew angle is between 30 and 40 degrees.

6. The bearing housing of claim 1, wherein the cross-sectional dimension is defined circumferentially relative to the axis.

7. The bearing housing of claim 1, wherein the cross-sectional dimension is between 1.35 and 1.55 times the radial thickness.

8. The bearing housing of claim 1, wherein the cross-sectional dimension is between 1.30 and 1.50 times the minimum distance.

9. A bearing assembly comprising:
   a housing including an annular wall extending about an axis and axially between a first housing end and a second housing end, the annular wall including:
     a plurality of holes spaced circumferentially from one another and spaced axially from the first housing end, the plurality of holes extending through the annular wall toward the axis; and
     an interior housing surface extending about the axis and defining interior openings of the plurality of holes, the interior housing surface having a cylindrical portion circumscribing a bearing cavity, the cylindrical portion extending axially from a first location proximate to the first housing end to at least a second location between the first location and the interior openings;
   a bearing including an outer race extending about the axis and axially between a first outer-race end and a second outer-race end, the outer race received by the housing inside the bearing cavity such that the first outer-race end is proximate to the first housing end and the second outer-race end is proximate to the interior openings;
   wherein the outer race includes an exterior outer-race surface extending circumferentially about the axis and axially between the first and second outer-race ends, and the interior openings are located axially between the exterior outer-race surface and the second housing end, and wherein the second outer-race end includes an outer transition surface adjacent to the exterior outer-race surface, the outer transition surface axially overlapping the interior openings.

10. The bearing assembly of claim 9, wherein each hole of the plurality of holes extends toward the axis at a skew angle relative to the axis, the skew angle being acute toward the first housing end.

11. The bearing housing of claim 9, wherein each hole of the plurality of holes has a cross-sectional dimension defined circumferentially relative to the axis, the cross-sectional dimension being at least equal to at least one of a radial thickness of the annular wall and a minimum distance between exterior openings of consecutive holes of the plurality of holes.

12. The bearing housing of claim 11, wherein the cross-sectional dimension is between 1.35 and 1.55 times the radial thickness.

13. The bearing housing of claim 11, wherein the cross-sectional dimension is between 1.30 and 1.50 times the minimum distance.

14. A turbine engine comprising:
   a casting defining a wet cavity;
   a housing including an annular wall extending about an axis and axially between a first housing end away from the casting and a second housing end proximate to the casting, the annular wall including:
     a plurality of holes spaced circumferentially from one another and spaced axially from the first housing end, the plurality of holes extending through the annular wall toward the axis; and
     an interior housing surface extending about the axis and defining interior openings of the plurality of holes, the interior housing surface having a cylindrical portion circumscribing a bearing cavity in fluid communication with the wet cavity, the cylindrical portion extending axially from a first location proximate to the first housing end to at least a second location between the first location and the interior openings, the plurality of holes in fluid communication with the wet cavity via the bearing cavity;

a bearing including an outer race extending about the axis and axially between a first outer-race end and a second outer-race end, the outer race received by the housing inside the bearing cavity such that the first outer-race end is located proximate to the first housing end and the second outer-race end is located proximate to the interior openings.

15. The turbine engine of claim 14, wherein the outer race includes an exterior outer-race surface extending circumferentially about the axis and axially toward the plurality of holes from a first edge located proximate to the first location to a second edge proximate to the second location, and the interior openings are located axially between the second edge and the second housing end.

16. The turbine engine of claim 15, wherein the annular wall includes an exterior housing surface surrounding the interior housing surface and defining exterior openings of the plurality of holes, each hole of the plurality of holes extending axially away from the second housing end as it extends from a corresponding interior opening of the interior openings to a corresponding exterior opening of the exterior openings.

17. The turbine engine of claim 16, wherein the exterior openings extend axially away from the first housing end from a first exterior axial location to a second exterior axial location, the first exterior axial location located axially between the first and the second edges of the exterior outer-race surface.

18. A bearing housing for a bearing having an outer race, the bearing housing comprising:
an annular wall extending about an axis and axially between a first end and a second end, the annular wall including:
a plurality of holes spaced circumferentially from one another and spaced axially from the first end, the plurality of holes extending through the annular wall toward the axis; and
an interior housing surface extending about the axis and defining interior openings of the plurality of holes, the interior housing surface having a cylindrical portion defining a seat for radial engagement with the outer race, the cylindrical portion extending axially from a first location proximate to the first end to at least a second location between the first location and the interior openings;
wherein each hole of the plurality of holes extends toward the axis at a skew angle relative to the axis, the skew angle being acute toward the first end, and wherein the skew angle is between 30 and 40 degrees.

* * * * *